United States Patent
Hughes et al.

(10) Patent No.: US 8,122,476 B2
(45) Date of Patent: Feb. 21, 2012

(54) SYSTEM AND METHOD FOR REDUCING INTERLACE ARTIFACTS DURING TRICK MODE PLAYBACK

(75) Inventors: Gary Hughes, Chelmsford, MA (US); Vitaliy M. Slobotskoy, Arlington, MA (US)

(73) Assignee: General Instument Corporation, Horsham, PA (US)

( * ) Notice: Subject to any disclaimer, the term of this patent is extended or adjusted under 35 U.S.C. 154(b) by 625 days.

(21) Appl. No.: 12/184,228

(22) Filed: Jul. 31, 2008

(65) Prior Publication Data

US 2010/0031301 A1 Feb. 4, 2010

(51) Int. Cl.
*H04N 7/173* (2006.01)
(52) U.S. Cl. .............. 725/90; 725/88; 725/89; 725/91
(58) Field of Classification Search .............. 725/87–91, 725/102
See application file for complete search history.

(56) References Cited

U.S. PATENT DOCUMENTS

| 2002/0163964 | A1* | 11/2002 | Nichols | 375/240.03 |
| 2005/0120377 | A1* | 6/2005 | Carlucci et al. | 725/90 |
| 2008/0115176 | A1* | 5/2008 | Rodriguez | 725/89 |
| 2008/0263621 | A1* | 10/2008 | Austerlitz et al. | 725/139 |

* cited by examiner

*Primary Examiner* — Kieu Oanh T Bui
(74) *Attorney, Agent, or Firm* — Stewart M. Wiener

(57) ABSTRACT

A system and method for reducing interlace artifacts during trick mode playback of pre-encoded content. The system and method operate a decoder to receive a video signal, configured as frames, with each frame having a plurality of interlaced fields, and to provide a video output in interlaced format or trick mode format. When operating in a normal mode, the decoder provides the video output in the interlaced format. When operating in trick mode, the decoder is instructed to use one of the fields of a frame as a reference field, and outputs a video output frame in the trick mode format where both fields of the video output frame are the same as the reference field. The video signal can be a streaming video or read from a medium.

16 Claims, 3 Drawing Sheets

SYSTEM AND METHOD FOR REDUCING INTERLACE ARTIFACTS DURING TRICK MODE PLAYBACK

FIELD OF THE INVENTION

The present invention relates generally to a system and method for improving trick mode playback of a video. More particularly, the present invention relates to a system and method for reducing interlace artifacts during trick mode playback of pre-encoded content.

BACKGROUND

Television systems typically use a pair of interlaced fields to compose an entire frame or picture on the display. According to the National Television Systems Committee (NTSC) standards, in television system in the United States, 29.97 frames are transmitted per second as 59.94 fields, so that the display is updated 59.94 times per second, which is fast enough to avoid the appearance of the display flickering. In such a system, one field will contain the odd numbered scan lines of the image, while the other field contains the even numbered scan lines.

When the television program is generated from an interlaced source, such as a video camera, these fields represent different moments in time. For example, an actor walking across the set may be in a different location from one field to the next. Also, camera motion may cause the entire image to shift between fields. On the other hand, if the program is generated from a progressive (non-interlaced) source, such as film, the fields represent the same moment in time.

Video on Demand (VOD) servers that generate dynamic trick mode sequences typically use the intra-coded pictures present in the stream to generate these sequences. As understood in the art, a "trick mode" is a mode other than normal playback, such as fast forward, rewind and so on. A trick mode sequence typically consists of the intra-coded picture followed a series of inter-coded pictures (P-repeats) that force the decoder to redisplay the current image. Traditional server architectures that rely on trick mode files will typically re-encode the intra-coded pictures and are thus able to groom them to their own requirements.

Content that is encoded for VOD use is typically encoded as a stream of frame pictures, where each frame contains the contents of two fields. However, it is generally not possible to separate the coded frame into its fields without decoding the frame. In a trick mode sequence, both fields are displayed for the original intra-coded frame, and the subsequent repeat frames cause both fields to be redisplayed.

Hence, if the original content originated from a progressive source, such as movie film, the two fields represent the same instant in time and the effect of redisplaying the two fields is a stable image. However, if the content originated from an interlaced source, the images in the two fields may be different and the visual effect will be that of redisplaying two alternate, superimposed images, each at 29.27 or 25 times per second, which results in flicker in the picture that can be very distracting.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
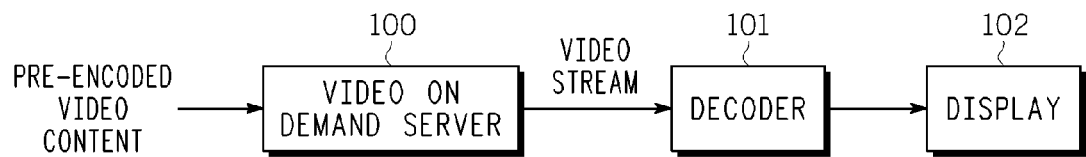
FIG. 1 is a block diagram illustrating an example of video on demand server ("server"), decoder and video display employing an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for reducing interlace artifacts during trick mode playback of pre-encoded content. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system for reducing interlace artifacts during trick mode playback of pre-encoded content described herein. The non-processor circuits may include, but are not limited to, a radio receiver, a radio transmitter, signal drivers, clock circuits, power source circuits, and user input devices. As such, these functions may be interpreted as steps of a method for reducing interlace artifacts during trick mode playback of pre-encoded content. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 illustrates an example of a server 100 that is operable to reduce interlace artifacts during trick mode playback of pre-encoded content. As can be appreciated by one skilled in the art, the server 100 can include, for example, a processor and associated hardware and software for performing the operations described herein.

Figure 2:
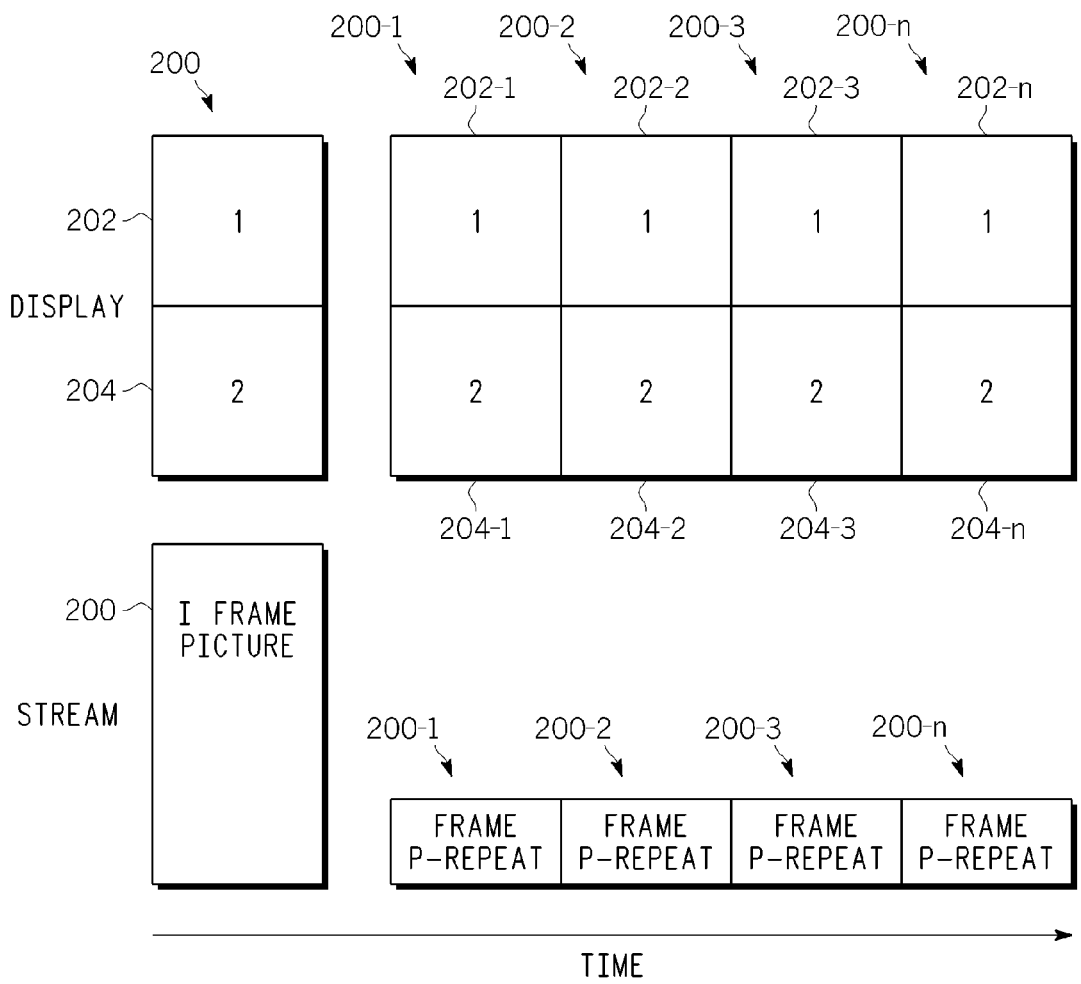
FIG. 2 is a conceptual block diagram illustrating an example of a normal frame based trick sequence.

When video content, such as pre-encoded video content, is to be displayed on a display 102 such as a television, video screen and so on, the server 100 transmits each frame to the decoder 101 as two interleaved fields as discussed in the Background section above. That is, as shown in FIG. 2, each frame 200 includes a first field 202 (identified as "1") and a second field 204 (identified as "2"). It is noted that for illustrative purposes, the first field 202 and second field 204 are shown as being in the top and bottom halves, respectively, of the frame 200. However, in actuality, the fields 202 and 204 are interlaced as discussed in the Background section above. The video content can be received by the decoder 101 from a storage device, such as a DVD, memory stick, and so on, or could be streaming video data from the server 100. Each field and frame can be identified in any suitable manner, for example, a pointer, tag or metadata, as described in U.S. patent application Ser. No. 10/730,365, filed on Dec. 8, 2003, the entire disclosure of which is incorporated herein by reference.

That is, as understood in the art, an MPEG video stream encoded for VOD includes predictive frame pictures (P-frames), and intra-coded frame pictures or intraframes (I-frames). Each of the P-frames includes two fields (P-fields) and each of the I-frames includes two fields (I-fields).

FIG. 2 further illustrates an example of the manner in which a normal frame based trick mode sequence operates, such as for a rewind, fast forward or pause operation. For example, as can be appreciated by one skilled in the art, the intra-coded frame picture (I-frame) 200 is transmitted followed by a series of "P-repeat" frames 200-1, 200-2, 200-3, 200-n. A P-repeat frame (e.g., 200-1) is an inter-coded frame picture that indicates to the decoder in the display 102 that nothing has changed since the previous picture, forcing the display 102 to display the same image again. Each field (e.g., fields 202 and 204) will contain the same image as the corresponding field in the previous picture. Hence, each of the P-repeat frames 200-1, 200-2, and 200-3 ... includes P-repeat fields 202-1/204-1, 202-2/204-2, 202-3/204-3 ... 202-n/204-n, respectively.

However, as discussed in the Background section above, this type of trick mode operation can result in undesirable flicker.

Figure 3:
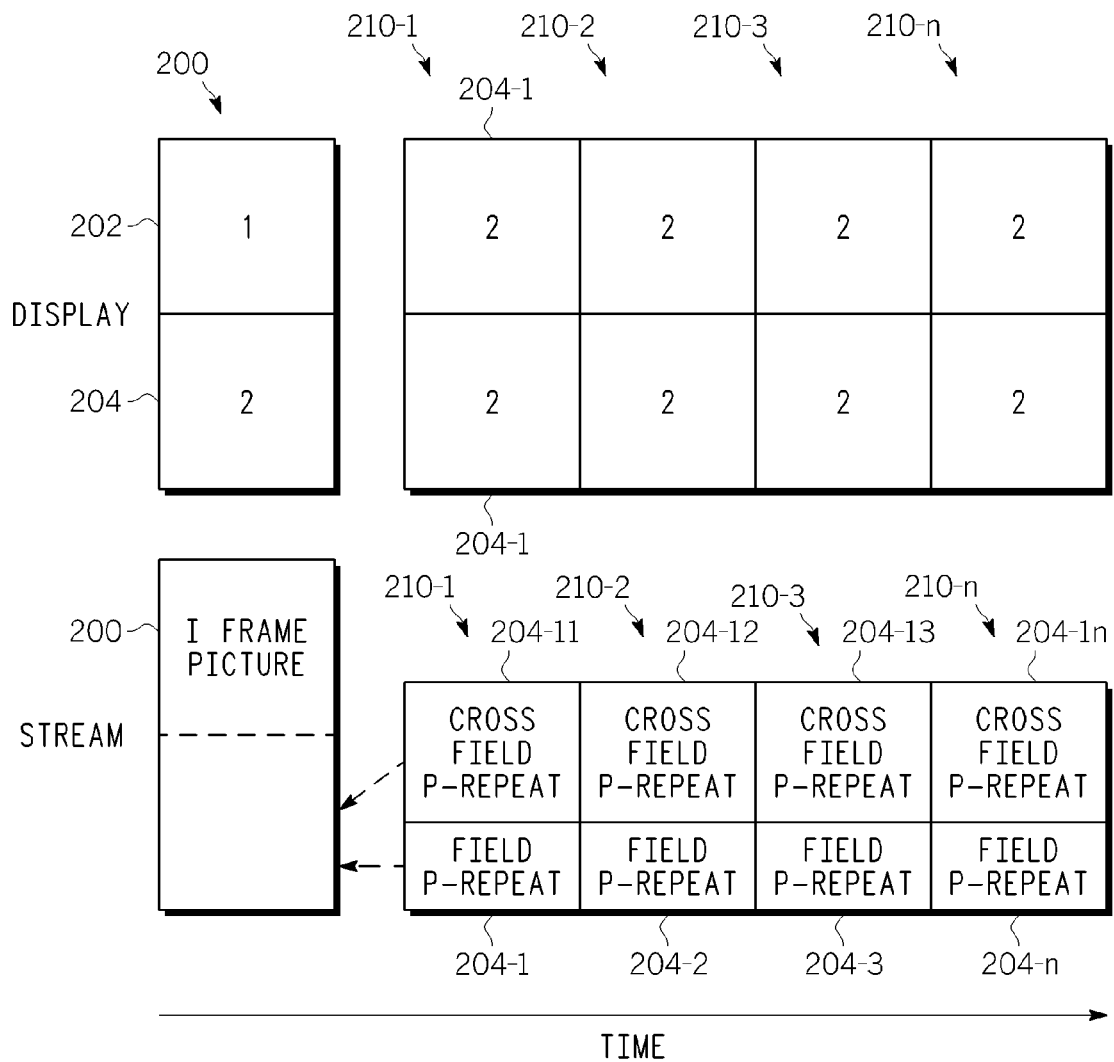
FIG. 3 is a conceptual block diagram illustrating an example of a field deinterlace trick mode sequence according to an embodiment of the present invention.

Hence, a field deinterlace trick mode sequence according to an embodiment of the present invention changes the sequence to use pairs of P-repeat field pictures instead of the P-repeat frame pictures as discussed above. In this type of field P-repeat technique, one of the previously displayed fields (e.g., field 204) of a P frame picture is used as the reference field for both P-repeat field pictures in the pair as shown in FIG. 3. The first field (e.g., 204-1) of the pair, is coded to use the second field (e.g., 204) of the previous I-frame or P-frame as its reference, thus making it appear identical to the second field 204. The second P-repeat field 204-11 of the pair also references the second field 204 of the previous I-frame or P-frame, so now both displayed fields contain the same image (e.g., the image in field 204). That is, the image displayed by the second P-repeat field 204-11 is identical to the image displayed by first P-repeat field 204-1. Naturally, in a further example, the other field 202 can instead be used as the reference field, with the first and second P-repeat fields displaying an image identical to the image displayed by first field 202. Hence, as illustrated, the P-repeat frames 210-1, 210-2, 210-3 ... 210-n include identical P-repeat field pairs 204-1/204-11, 204-2/204-12, 204-3/204-13 ... 204-n/204-1n.

Figure 4:
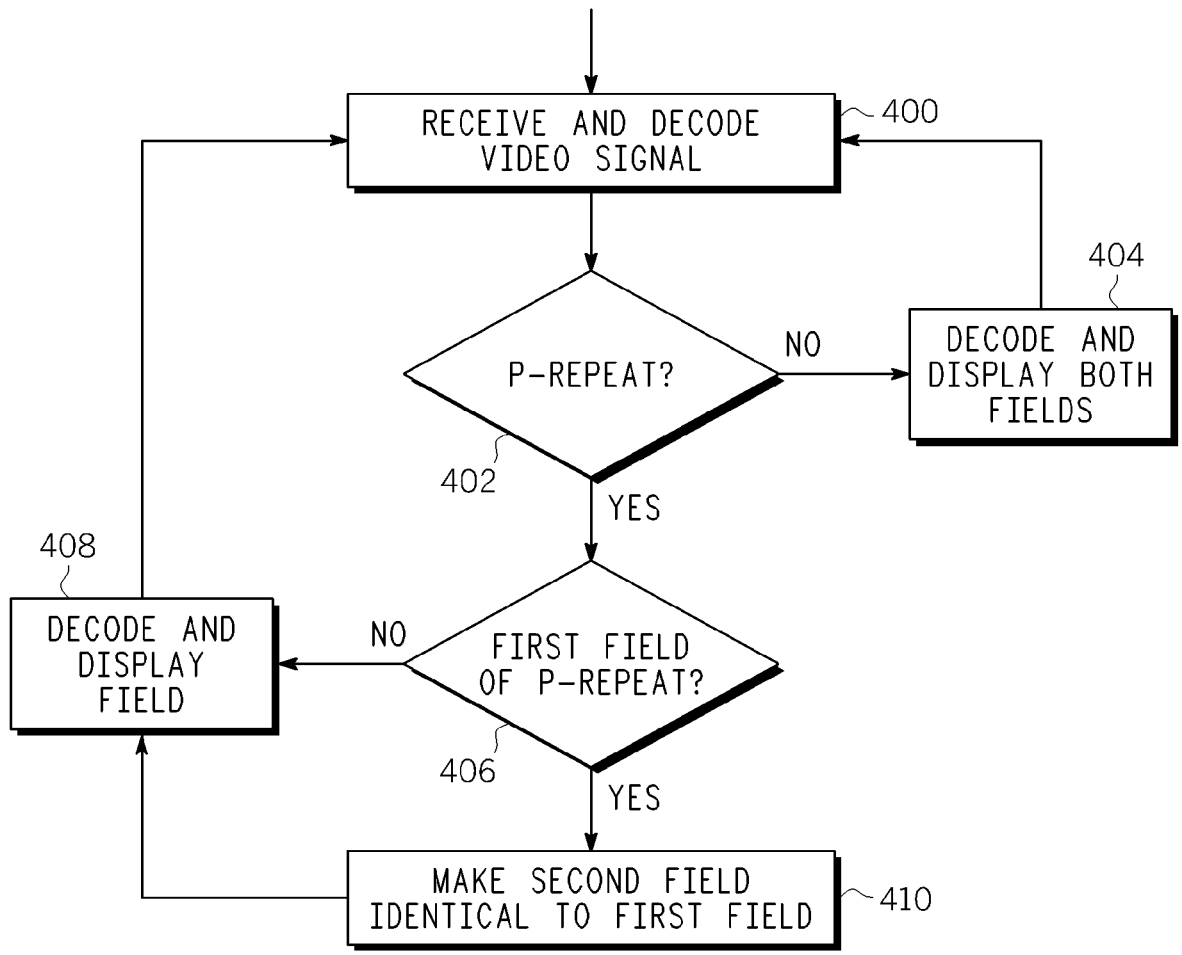
FIG. 4 is a flowchart illustrating an example of operations performed in accordance with an embodiment of the present invention as the result of receiving the field deinterlace trick mode sequence as shown in FIG. 3.

FIG. 4 is a flowchart illustrating examples of operations performed by the decoder 101 when it is receiving a field deinterlace trick mode sequence according to an embodiment of the present invention. For example, in step 400, the decoder 101 receives the video signal. In step 402, the decoder 101 receives a P-repeat picture if a trick mode operation (e.g., reverse, fast forward, pause) is being performed. If not, in step 404, the decoder 101 passes the interlaced fields to the display 102 for display and stores the fields for future use as references. However, if a trick mode operation is being performed, the decoder 101 in step 406 is instructed to use one of the fields (e.g., field 204) of a frame 200 as a reference field, which is used in step 408 to create the first field of the frame to be displayed in the trick mode. In step 410, the decoder 101 is instructed to use the same field (field 204) as the reference for the second field of the frame to be displayed in the trick mode. The process then repeats for each next frame in the trick mode, until the trick mode operation no longer being performed.

As can be understood by one skilled in the art, the above technique can use standard MPEG syntax elements to force the client (e.g., decoder 101) to deinterlace the content as the decoder 101 is decoding the content. The technique is applicable to, for example, content encoded in MPEG-2 or H.264/AVC and, since it uses only standard syntax elements defined by the relevant standards, it can be applied to any decoder that complies with those standards The MPEG-2 related technique can use macroblocks coded to reference the opposite field in the cross field P-repeat. An implementation for H.264/AVC can use Memory Management Control Operations (MMCOs) in the P-repeat pictures to manipulate the reference picture list to achieve the cross field reference. As can be appreciated by one skilled in the art, this technique can be more flexible and requires less memory than the coded macroblock approach used for MPEG-2.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A system for video playback, comprising:
a server, operating to transmit a video signal to a decoder, said signal configured as frames, with each frame having a plurality of interlaced fields, and to provide a video signal in interlaced format or trick mode format;
wherein:
when the server is operating in normal mode, the server provides the video signal to the decoder in the interlaced format; and
when the server is operating in trick mode, the server identifies one of the fields of a frame as a reference field, and outputs a video signal frame in the trick mode format forcing the decoder to display two identical fields of the video output frame, both the same as the reference field.

2. A system as claimed in claim 1, wherein:
when the server is operating in the trick mode, the server outputs a next video output frame whose both fields, when decoded, are the same as the reference field.

3. A system as claimed in claim 2, wherein:
the server continues to output each next video output frame having both fields the same as the reference field while operating in the trick mode.

4. A system as claimed in claim 1, wherein:
said both fields of the video output frame are the same as the reference field and interlaced with each other.

5. A system as claimed in claim 1, further comprising:
a decoder and display for displaying the video output frame in the interlaced format when received from the decoder, and for displaying the video output frame in the trick mode format when received from the decoder.

6. A system as claimed in claim 1, wherein:
the video signal transmitted is a streaming video signal.

7. A system as claimed in claim 1, wherein:
the video signal is read from a medium.

8. A system as claimed in claim 1, wherein:
the server uses Memory Management Control Operations to identify said one of the fields of the frame as the reference field.

9. A method for controlling a decoder in accordance with a video signal to perform video playback, comprising:
operating the decoder to receive the video signal, configured as frames, with each frame having a plurality of interlaced fields, and to provide a video output in interlaced format or trick mode format;
operating the decoder in a normal mode to provide the video output in the interlaced format; and
operating the decoder in trick mode, to identify one of the fields of a previous frame as a reference field, and output a video output frame in the trick mode format where both fields of the video output frame are the same as the reference field.

10. A method as claimed in claim 9, wherein:
operating the decoder by means of the transmitted video signal to output a next video output frame whose both fields are the same as the reference field when the decoder is operating in the trick mode.

11. A method as claimed in claim 10, wherein:
operating the decoder by means of the transmitted video signal to continue to output each next video output frame having both fields the same as the reference field while operating in the trick mode.

12. A method as claimed in claim 9, wherein:
said both fields of the video output frame are the same as the reference field and interlaced with each other.

13. A method as claimed in claim 9, further comprising:
operating a display to display the video output frame in the interlaced format when received from the decoder, and to display the video output frame in the trick mode format when received from the decoder.

14. A method as claimed in claim 9, wherein:
the video signal is a streaming video signal.

15. A method as claimed in claim 9, wherein:
the video signal is read from a medium.

16. A method as claimed in claim 9, wherein:
the step of operating the decoder in trick mode includes using Memory Management Control Operations to identify said one of the fields of the frame as the reference field.

* * * * *